United States Patent

Hardy et al.

[11] Patent Number: 6,145,546
[45] Date of Patent: Nov. 14, 2000

[54] FLEXIBLE FLOWLINE FOR CONVEYING FLUIDS

[75] Inventors: Jean Hardy, Barentin; Michel Paul Morand, Duclair, both of France

[73] Assignee: Coflexip, France

[21] Appl. No.: 09/423,995

[22] PCT Filed: Jun. 3, 1999

[86] PCT No.: PCT/FR99/01305

§ 371 Date: Nov. 17, 1999

§ 102(e) Date: Nov. 17, 1999

[87] PCT Pub. No.: WO99/66247

PCT Pub. Date: Dec. 23, 1999

[51] Int. Cl.[7] .................................... F16L 11/16
[52] U.S. Cl. .................. 138/136; 138/135; 138/131; 138/134; 138/129
[58] Field of Search .................. 138/136, 135, 138/131, 129, 130, 132, 133, 137, 138

[56] References Cited

U.S. PATENT DOCUMENTS

| | | | |
|---|---|---|---|
| 3,311,133 | 3/1967 | Kinander | 138/136 |
| 3,340,900 | 9/1967 | Spurlock | 138/136 |
| 4,326,561 | 4/1982 | Kutnyak | 138/136 |
| 4,800,928 | 1/1989 | Kanao | 138/122 |
| 5,601,893 | 2/1997 | Strassel et al. | 138/120 |
| 5,645,110 | 7/1997 | Nobileau | 138/135 X |
| 5,934,335 | 8/1999 | Hardy | 138/135 X |
| 6,024,135 | 2/2000 | Nobileau | 138/135 X |

FOREIGN PATENT DOCUMENTS

| | | |
|---|---|---|
| 2136974 | 2/1974 | France . |
| 2268614 | 10/1976 | France . |
| 2732441 | 10/1996 | France . |
| 2752904 | 3/1998 | France . |
| 9524578 | 9/1995 | WIPO . |

*Primary Examiner*—Patrick Brinson
*Attorney, Agent, or Firm*—Ostrolenk, Faber, Gerb & Soffen, LLP

[57] ABSTRACT

Flexible pipe for transporting fluids, comprising, from the inside outwards, a flexible metal carcass with a helical winding of non-contiguous turns, a compressible rod fitted into the gap between the consecutive turns of the helical winding, the compressible rod has a substantial volumetric deformation in compression of at least 50%, an internal sealing sheath extruded over the said metal carcass, at least one ply of armours wound around the said internal sealing sheath and at least one external sealing sheath arranged around the said ply of armours, the rod, its materials, its elastic modules and other features thereof are disclosed.

18 Claims, 3 Drawing Sheets

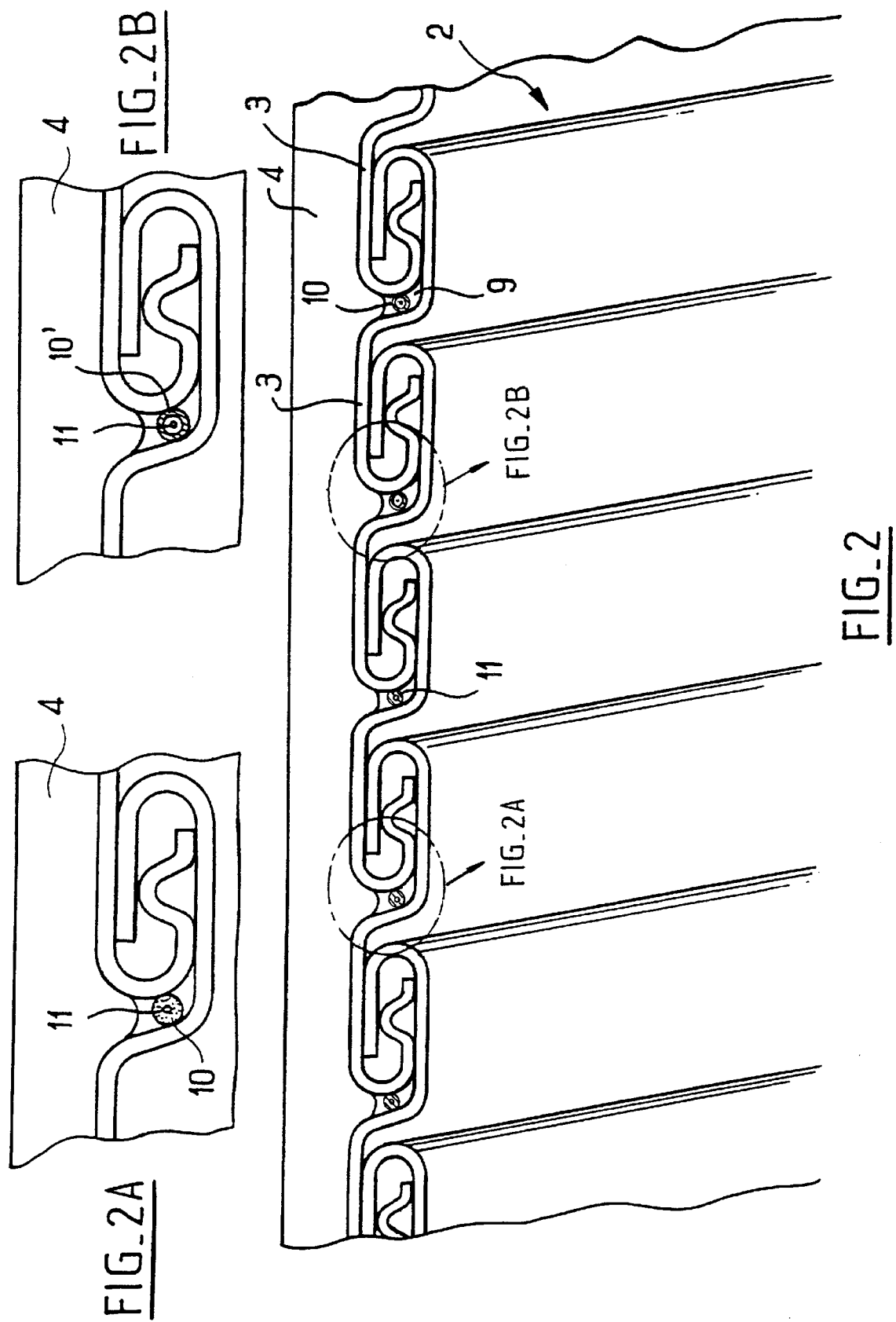

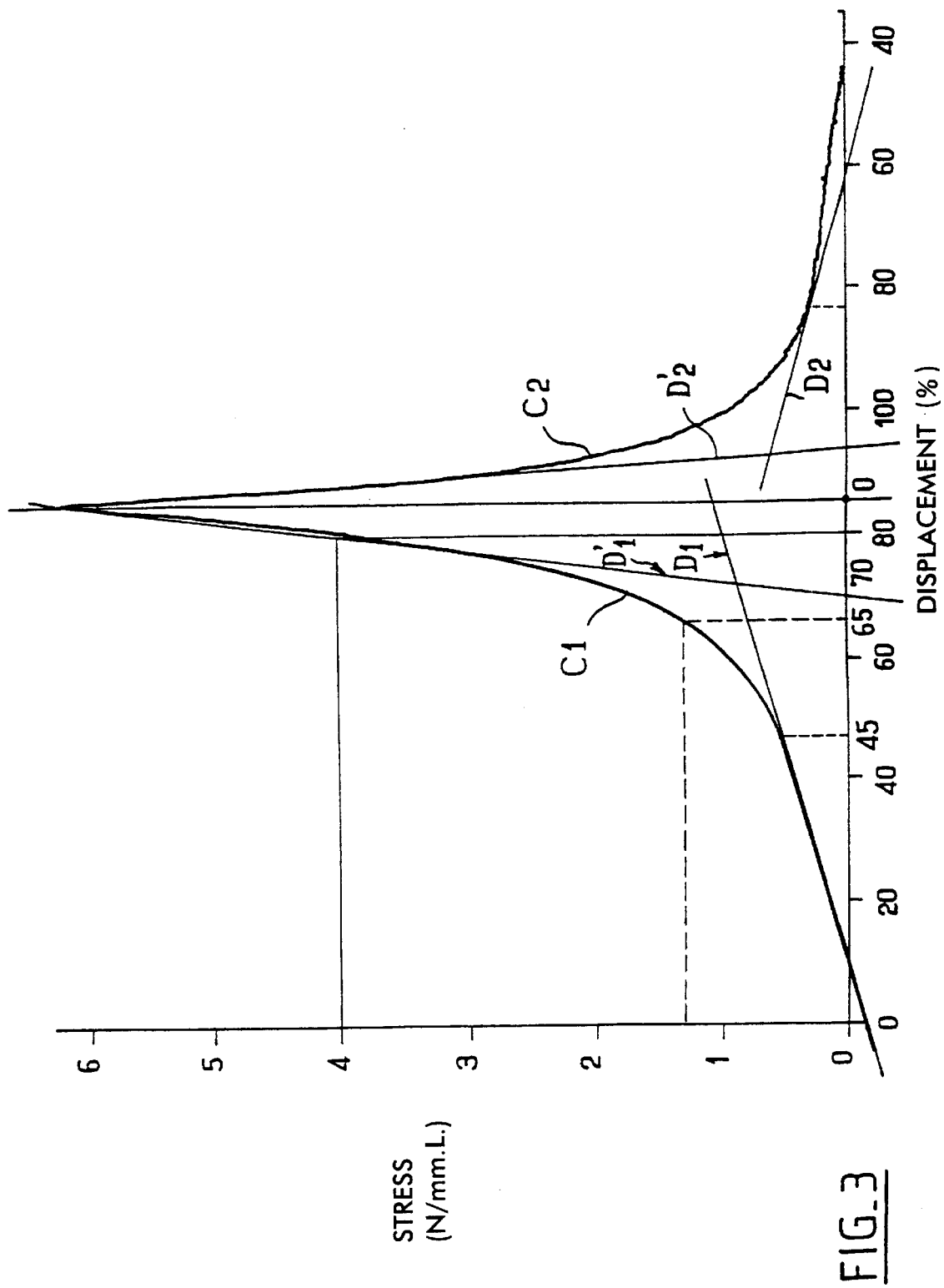
FIG_3

FLEXIBLE FLOWLINE FOR CONVEYING FLUIDS

BACKGROUND OF THE INVENTION

The present invention relates to a flexible pipe capable of being used for transporting fluids such as hydrocarbons for example.

Several types of flexible pipe are used. Some flexible pipes comprise, from the inside outwards, an internal sealing sheath made of plastic, elastomer or some other relatively flexible appropriate material; an unsealed flexible metal tube which has to withstand the loads developed by the pressure of the fluid flowing along the pipe; one or more plies of armours and at least one external sealing sheath made of a polymeric material. This type of flexible pipe is often termed a "smooth-bore" by specialists in this subject.

Other flexible pipes termed "rough-bore" comprise, from the inside outwards, an unsealed metal tube known as the carcass, consisting of a section wound into interlocked turns such as, for example, an interlocked metal strip or wire of an interlocking shape such as a wire in the shape of a T, U, S or Z, an internal sealing sheath made of a polymeric material, one or more plies of armours capable of withstanding the forces developed by the pressure of the fluid flowing through the pipe and the external forces to which the flexible pipe is subjected, and at least one external protective sheath of the polymeric type.

In the latter type of flexible pipe, the internal sealing sheath is directly extruded, continuously, over the carcass which, between the wound turns, has spaces or gaps.

To ensure good contact between the internal sealing sheath and the metal carcass, it is necessary for the inside diameter of the internal sealing sheath to be as close as possible and even equal to the outside diameter of the flexible metal carcass.

When manufacturing a flexible pipe of the "rough-bore" type, the internal sealing sheath which is extruded over the metal carcass shrinks onto the latter as it cools. Depending on the materials used to produce the internal sealing sheath, deformations known as "shrinkage cavities" appearing on the internal face of the said internal sealing sheath and particularly on each side of the gaps between the turns of the metal carcass can be observed after cooling. Such shrinkage cavities are due, it would seem, to the differential shrinkage of the material used for the internal sealing sheath, because of the variation in cooling gradient through the thickness of the internal sealing sheath, combined with the effect of the gaps between the turns of the metal carcass. What actually happens is that since the extruded plastic sealing sheath is in contact via its internal face with the metal carcass which is at ambient temperature, the cooling of the said internal face is very quick, and this causes surface irregularities or shrinkage cavities; this phenomenon is amplified at the gaps between the turns of the metal carcass, the differential shrinkage at these points leading to local variations in the thickness of the internal sealing sheath. When the sealing sheath is made of semicrystalline polymer, sensitive to the presence of surface defects leading to a deterioration in the sheath which may go so far as to rupture it, such as for example PVDF, this very often, in operation, leads to degradation of the sealing sheath (rupture) so that it then no longer fulfils its sealing function.

In order to remedy a drawback of this nature and to solve the problem which arises through the appearance of shrinkage cavities, the solution of depositing a thin sacrificial sublayer of an appropriate material such as PVDF between the metal carcass and the internal sealing layer was found and adopted. The internal sealing sheath is then extruded over the said sacrificial sublayer but making sure that there is no "welding" or intimate bonding between the sealing sheath and the "sacrificial" sublayer, so that cracks propagating from the internal face of the sublayer outwards are stopped at the interface between the sealing sheath and the sacrificial sublayer. This is what is described in WO 95/24578.

The major disadvantage of this solution is the slippage that is likely to occur between the internal sealing sheath and the sacrificial sublayer at the ends of the flexible pipe, and the additional cost in raw material and in transformation (manufacturing) caused by the presence of the said sacrificial sublayer.

It is also possible to produce a sacrificial sublayer in the form of a thin tape (maximum 2 mm thick) obtained from a homopolymer or a copolymer. Naturally, the extruded sheath, also known as the pressure sheath, and the sacrificial sublayer, in the form of a film or tape, exhibit deformation at the gaps and this allows the assembly consisting of the sheath and the sacrificial sublayer to catch on the interlocked metal strip of the internal carcass, the deformation not being sufficient to create shrinkage cavities on each side of each gap, because of the thermal conditions generated in the volume thus created.

Other solutions for eliminating the appearance of shrinkage cavities or for lessening their effects have been sought.

Among these last solutions, the purpose of which is to install an internal sealing sheath which, after cooling, has a smooth and cylindrical internal face, employ shaping which is either internal, with the main drawback that it creates longitudinal cracks on the internal face of the sealing sheath and folds of material on the external face, or external with the drawback of a complete absence of anchorage of the sealing sheath to the metal carcass.

In the technique for manufacturing flexible pipes of the "smooth-bore" type, which consists in producing separately the internal sealing sheath, using any appropriate means such as extrusion, and the metal carcass, it has been recommended that the sealing sheath or the metal carcass be heated once the two elements have been assembled, so as to keep the sealing sheath plastic or render it plastic in order to force it to creep into the gaps between the turns of the metal carcass. Such manufacturing methods are described in particular in FR-B-74 14 398 (COFLEXIP) and addition No. 71 16 880 (IFP).

However, the sole purpose of these methods is to cause permanent creep of the polymeric sealing sheath between the turns of the metal carcass after or at the same time as stresses are developed in the internal sealing sheath so as to bring about intimate contact, the stresses developed being due, for example, to a pressurizing of the said internal sealing sheath.

In an exemplary embodiment described in patent FR-B-74 14 398 and which relates to a flexible pipe comprising a peripheral sheath extruded over an assembly comprising, from the inside outwards, an internal sealing sheath, a pressure arch, two plies of armours and a metal lattice, it is recommended that the assembly be heated prior to extruding the peripheral sheath so as to keep at least the internal face of the said peripheral sheath in the plastic state or, more precisely, in the thermoplastic state so as, and this is the desired objective, to cause the internal face to creep into the meshes of the metal lattice to completely fill them and thus completely attach the peripheral sheath to the metal lattice.

Under these conditions, it is essential that the assembly be heated strongly to temperatures of the order of several hundred degrees Celsius. Such techniques have yielded such poor results that they were very soon abandoned because the filling both of the spaces in the pressure arch and of the meshes of the metal lattice rigidified the pipe and therefore reduced the essential property of flexibility which it is imperative that it exhibit.

U.S. Pat. No. 3,311,133 describes a pipe comprising an internal metal carcass consisting of an interlocked S-shaped metal strip, in the gaps of which is inserted a compressible rod. The pursued objective is to control the spacing between the turns of the metal strip while at the same time ensuring that the said carcass has a certain flexibility. The rod recommended in this patent is made of a material which is dense although compressible and which has mechanical and plastic properties which are such that it cannot be used in the specific application of the present invention and which will be described later on. A disadvantage of the compressible rod of the prior art is that it is unable to take up the tensile load when being fitted between the turns of the internal metal carcass.

In French application 96 10 490 filed by the applicant company, it is recommended that the metal carcass be heated to a temperature of below 100° C. upstream of the extrusion means so as to avoid sudden cooling of the internal face of the sealing sheath as it is extruded over the metal carcass. Work carried out on flexible pipes with preheated carcasses have demonstrated that the heat-induced creep of the internal sealing sheath was increased and that this sometimes caused the metal strip to lock. Such locking has the result of shifting the neutral axis in bending and therefore of increasing the deformation of the internal sealing sheath or pressure sheath on the outside of the bend. Now, when the complete flexible pipe is curved to the MBR (minimum bending radius) and if the strip is locked, it is easy to understand that for a deformation of the pressure sheath of the order of 6% on the outside of the bend, there is a deformation of practically about 10 to 12% on the inside of the bend, which is unacceptable. Furthermore, thermoplastics exhibit elongation at the threshold which reduces as the temperature decreases, which means that their capacity for deformation is also reduced at low temperatures. This phenomenon is of merely relative importance in the case of materials with a high elastic deformation, typically greater than 12% at the loading temperature, provided their capacity for deformation is maintained over time. By contrast, in the case of materials whose elastic deformation is limited, typically below 10 to 12% of the loading temperature, rupture may occur because this capacity for deformation is exceeded.

The use of thermoplastics whose capacity for deformation is high (greater than 10%) has not yielded good results because known thermoplastics are unable to withstand temperatures higher than 130 to 150° C. (homopolymers or copolymers of PVDF) or exhibit other disadvantages such as poor creep strength (PFA). This is why, for an effluent temperature of about 130° C., use is made of plasticized PVDF homopolymer. However, the plasticizer gradually disappears over time and this leads to an unplasticized thermoplastic which is unable to withstand the thermal and mechanical loadings. The loss of plasticizer is also a problem in that part of the pipe which is housed in the end fitting.

Furthermore, industrial implementation of a heated carcass and subsequent extrusion of the internal sealing sheath poses real problems. This is because the temperature-induced creep into the gaps varies according to the viscosity of the plastic used for the internal sealing sheath and the temperature to which the metal carcass is heated. As the physico-chemical properties of the said plastic may vary from one batch to another, it is practically impossible to have control over the temperature-induced creep under normal conditions of industrial implementation; complete temperature-induced creep has often been observed, that is to say complete filling of the gaps. It is easy to understand that complete temperature-induced creep may lead to locking of the metal carcass and therefore to reduced pipe flexibility. For example, when the filling of the gap by the internal sealing sheath is more than 90%, there is a risk that the flexible pipe will lock up at certain points.

SUMMARY OF THE INVENTION

The object of the present invention is to overcome the aforementioned disadvantages and to propose a flexible pipe in which at least the internal sealing sheath is made of thermoplastics which alone or in combination exhibit significant temperature-induced creep and viscoelastic elongation of below 10–12% throughout the range of temperatures which lie between the service limits, and without forming shrinkage cavities.

To achieve this, the effects of heating the carcass so as to avoid the formation of shrinkage cavities as explained in the application studied earlier and filed in the name of the applicant company is combined with a limitation of the temperature-induced creep of the internal sealing sheath into the gaps between the turns of the carcass so as not to lock up the movement of the metal strip that forms the said carcass, while at the same time obtaining positive catching of the internal sealing sheath on the said carcass, the said catching being a result of the limited temperature-induced creep into the gaps.

One subject of the present invention is a method for manufacturing a flexible pipe for transporting fluids such as hydrocarbons, of the type comprising, from the inside outwards, a flexible metal carcass with a helical winding of non-contiguous turns, a compressible rod fitted into the gap between the consecutive turns of the helical winding, an internal sealing sheath extruded over the metal carcass, at least one ply of armours wound around the internal sealing sheath and at least one external sealing sheath arranged around the ply of armours, and the pipe is characterized in that the compressible rod has a substantial volumetric deformation in compression of at least 50%.

The fact of using a rod which is highly compressible, particularly under a low strain load, allows temperature-induced creep to occur as the internal sealing sheath is being extruded over the metal carcass, while at the same time restricting the penetration to a predetermined value.

According to one feature, the metal carcass is heated prior to the extrusion of the sealing sheath, and this makes temperature-induced creep easier while at the same time avoiding the formation of shrinkage cavities.

According to another feature, the rod is made of a cellular material comprising between 40 and 60% by volume of hollow cells and having a first elastic modulus $E_1$ of the cellular part and a second elastic modulus $E_2$ of the dense part, the ratio of the two moduli $E_1/E_2$ being at least higher than 10.

According to another feature, the rod consists of a hollow tube which may preferably be made of a dense material or may be made of a cellular material.

BRIEF DESCRIPTION OF THE DRAWINGS

Other features and advantages will emerge more clearly from reading the description of a preferred embodiment of the invention, and from the appended figures in which:

FIG. 2 is a diagrammatic and partial view of part of the metal carcass coated with part of an internal sealing sheath according to the present invention, FIG. 3 depicts a curve of stress in N/linear mm as a function of displacement in percent.

DESCRIPTION OF THE PREFERRED EMBODIMENT

Figure 1:
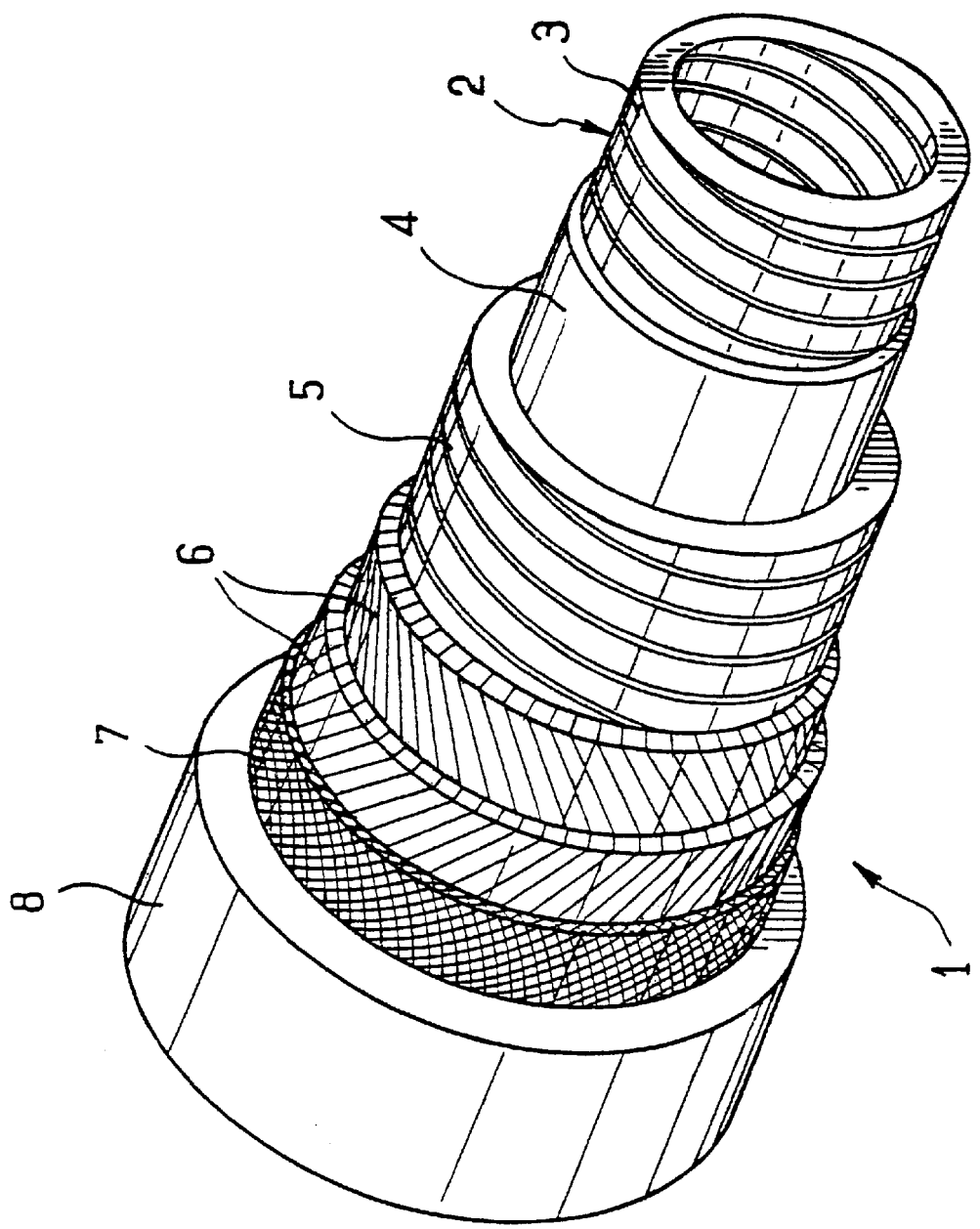
FIG. 1 is a partial perspective view with cutaway of a flexible pipe.

The flexible pipe 1 according to the invention is of the type comprising, from the inside outwards:

- a metal carcass 2 produced by a helical winding of a metal wire with non-contiguous turns 3 and a predetermined cross section, for example with an S-shaped cross section as in the example depicted in FIG. 2,
- an internal sealing sheath 4 arranged by extrusion around the metal carcass 2,
- a pressure arch 5,
- one or more plies of armour 6,
- possibly an intermediate strip 7, and
- an external sealing sheath 8.

The external sealing sheath 8 may also be extruded over the intermediate strip 7 if there is one or over the outer ply of armour 6. The internal sealing sheath 4 and external sealing sheath 8 are made of a common plastic or of different plastics, according to the requirements and end use of the flexible pipe 1.

As the metal carcass has non-contiguous turns 3, a space or gap 9 is formed between two consecutive turns 3. The helical winding of the carcass has an S-shaped cross-section, including one arm of the winding at each turn of the winding being outward of one arm of the S in the neighboring turn of the winding at one lateral side of the turn and being inward of the one arm of the S in the neighboring turn of the winding at the opposite lateral side of the turn, and the S-shapes of the turns being so shaped and located as to define the gap between the part of the S-shape connecting the arms of the S. During or after the manufacture of the metal carcass 2, a compressible rod 10 is fitted into the gaps 9 (FIG. 2). The compressible rod 10 may, depending on the stage of manufacture during which it is inserted into the gaps, be positioned in the bottoms of these gaps or at a certain height up from the bottom of the gaps. In any event, the rod is positioned in such a way that at most 75% of the volume of each gap may be filled by the substance of the internal sealing sheath 4 as, the said substance comes to press on the compressible rod. Of course, the geometry of the compressible rod is adapted to suit the shape of the gap; in a preferred embodiment of the invention, the cross section of the said compressible rod has a cross-sectional area at least equal to 25% of the right cross-sectional area of the gap at the mean pitch of the interlocked metal strip used for manufacturing the metal carcass so as to ensure, as specified earlier, that at most 75% of the volume is available for the temperature-induced creep of the internal sealing sheath.

In a first embodiment, the compressible rod is manufactured from a material which has to exhibit certain properties and, in particular, has to:

- have a volumetric compression ratio of at least equal to 50% and is chosen from the family of hydrocarbon elastomers and, preferably, from the family of silicon-containing or silico-fluorinated elastomers,
- be able to withstand, for at least five minutes, the temperature to which the internal sealing sheath is heated while it is being extruded over the metal carcass.

According to a preferred embodiment of the invention, the compressible rod is made of a cellular material which has a high volumetric compressibility under light load. The dense substance of the rod occupies a volume of between 40 and 60% of the total volume of the rod. With reference to FIG. 3 which, on the one hand, depicts a first curve $C_1$ (left-hand part) representing the stress in Newtons per linear millimeter and, on the other hand, a second curve $C_2$ depicting the elastic spring-back after compression, it may be seen that the material has a first elastic modulus $E_1$ relating to the hollow part of the said material and a second elastic modulus $E_2$ relating to the dense part of the same material. The modulus $E_1$ is determined by the straight line $D_1$ which is tangential to the curve $C_1$ for the abscise value of approximately 40%, whereas the elastic modulus $E_2$ is determined by the straight line $D'_1$ which is tangential to the curve $C_1$ for the abscise value of approximately 75%. The ratio $E_1/E_2$ is in any event higher than 10 and preferably higher than 30. From curve $C_1$, it may be seen that for a volumetric (or compressive) displacement of the rod by 50%, the stress that has to be applied in order to obtain such a displacement is 0.4 N/linear mm and that for 65% displacement the stress is of the order of 1.3 N/linear mm, the total compression of the cellular part of the rod corresponding to a displacement of 80% for a stress of 4 N/linear mm. Curve $C_2$ shows that the material tested had an elastic spring-back of at least 60%, that is to say that the material, when compression ceases, practically returns to its initial shape and volume. In any event, the volumetric compressibility is high for low stress below 1 Newton per linear millimeter for a 60% displacement of the substance of the said rod.

In a second embodiment, the compressible rod is produced in the form of a hollow tube 10', preferably of round cross section. The outside and inside diameters of the hollow tube are chosen, according to the nature of the material used to manufacture the said hollow tube, so that the volume occupied by the said rod in the compressed state is at most equal to half the volume occupied by the said rod in the uncompressed state. A preferred material for the manufacture of the rod is a silicon-containing or hydrocarbon elastomer with a shore A hardness of between 65 and 85.

The outside diameter of the hollow tube is of the order of 0.6 to 0.7 times the depth of the gap or free height of the carcass. For a metal strip of dimensions 48×1.2 mm used to make the carcass, the diameter will be 0.6×4×1.2=2.88 mm, for a strip measuring 40×0.8 mm, the diameter is preferably 0.7×4×0.8=2.24 mm.

The wall thickness of the hollow tube is from 0.1 to 0.25 and preferably from 0.12 to 0.15 times the diameter of the said hollow tube.

In order to allow it to take up the tensile load needed for fitting it into the gaps 9 in the metal carcass, at least one strengthener 11 is either embedded in the mass of the compressible rod 10 when the material used is a cellular material, or preferably arranged in the hollow part of the tube which forms the rod. In both instances, the strengthener is unidirectional and made of an inorganic, organic or vegetable substance. The unidirectional strengthener also provides the rod with a certain longitudinal stiffness so that the ratio $\Delta l/l$ is roughly near to zero, and this makes it even easier for it to be fitted into the gaps and makes it better at taking up the tensile load to which it may be subjected as it is fitted in the gaps of the metal strip; this thus avoids the variation (reduction) in cross section of the rod and allows the rod to maintain, in the gaps, the degree of compaction which it initially had (40 to 60%) prior to being fitted. In the case of the hollow tube, the strengthener 11 is preferably arranged at the center of the tube, although the positioning may be different. Likewise, it is possible to house the strengthener 11 in the substance of which the tube is made at any point whatsoever.

Of course, if the tensile load is relatively light during fitting into the gaps, it is then possible not to use a strengthener in the rod.

One method of manufacturing the flexible pipe described hereinabove consists in interposing the compressible rod while the metal carcass 2 is under axial tension and before the plastic sheath 4 is extruded over the said metal carcass. Axially tensioning the metal carcass has the result of allowing the gap 9 to be at its widest, so that the rod can easily be housed in the open gaps. When the axial tension is released, the dimensions of the gaps reduce, and this allows the compressible rod to be held in the appropriate position so as to limit the creep of the sheath 4 into the gaps.

All shapes or cross sections of rod such as round, triangular, rectangular, are possible, provided that, in all cases, they are compatible with the cross section of the carcass gap in which the rod is fitted.

The use of a rod in the form of a hollow tube instead of a solid cellular rod allows better adaptation to suit the dimensions of the gap. This is because when the gap is relatively large, the rod occupies the gap while being widely open. When the gap is not so wide, that is to say when two consecutive turns of the carcass are closer together, the rod deforms in the heightwise direction of the gap as the walls of the rod move closer together, thus making the rod more closed. For an even smaller gap width, the rod may be flattened, with the walls in contact with each other and compressed by the turns of the carcass. Thus, whatever the configuration of the carcass, the hollow tube which forms the rod can be used, because it better adapts to suit the dimensions of the gaps.

What is claimed is:

1. Flexible pipe for transporting fluids such as hydrocarbons comprising, from inside the pipe outwards, a flexible metal carcass with a helical winding of non-contiguous turns with a gap between the turns, a compressible rod fitted into the gap (9), between the consecutive turns of the helical winding, the compressible rod has a substantial volumetric deformation in compression of at least 50%, an internal sealing sheath extruded over the metal carcass, at least one ply of armours wound around the internal sealing sheath and at least one external sealing sheath arranged around the ply of armours.

2. Flexible pipe according to claim 1, wherein the rod is comprised of a cellular material consisting of a part made of a dense substance and of hollow cells, the dense substance occupying a volume between 40 and 60% of the total volume of the rod (10), and the material has a first elastic modulus ($E_1$) corresponding to compression of the hollow cells, and a second elastic modulus ($E_2$) corresponding to compression of the dense substance, the ratio ($E_1/E_2$) of the first elastic modulus to the second elastic modulus being at least equal to 10.

3. Flexible pipe (1) according to claim 2, wherein the cellular material is lightly stressed up to the 50% compression point, and that stress is less than one Newton per linear millimeter of the said rod.

4. Flexible pipe according to claim 3, wherein the stress is below 0.6 N per linear millimeter of the rod.

5. Flexible pipe according to claim 1, wherein the material of the rod experiences stress in excess of one Newton per linear millimeter of the rod from the 65% compression point onwards.

6. Flexible pipe according to claim 1, wherein the ratio $E_1/E_2$ of the elastic moduli is higher than 30.

7. Flexible pipe according to claim 1, wherein the rod consists of a hollow tube.

8. Flexible pipe according to claim 1, wherein the depth to which the internal sealing sheath penetrates the gap is at most equal to 75% of the depth of the gap.

9. Flexible pipe according to claim 8, wherein the depth of penetration of the internal sealing sheath is 50% of the depth of the gap.

10. Flexible pipe according to claim 1, characterized in that the material of the compressible rod is a silicon-containing elastomer.

11. Flexible pipe according to claim 1 further comprising at least one unidirectional strengthener housed inside the compressible rod (10, 10') for giving the rod a longitudinal stiffness to make the rod easier to fit into the gaps of the metal carcass (2).

12. Flexible pipe according to claim 10, wherein the unidirectional strengthener is made of an inorganic, an organic or a vegetable substance.

13. Flexible pipe according to claim 11, wherein the unidirectional strengthener is arranged approximately at the center of the hollow tube.

14. Flexible pipe according to claim 8 wherein the depth of penetration of the internal sealing sheath is 30% of the depth of the gap.

15. Flexible pipe according to claim 10, wherein the material of the rod is a silicon-containing elastomer.

16. Flexible pipe according to claim 7, wherein the unidirectional strengthener is arranged approximately at the center of the hollow tube.

17. Flexible pipe according to claim 1, wherein the helical winding of the carcass has an S-shaped cross-section with one arm of the S in each turn being outward of one drum of the S in the neighboring turn of the winding at one side of the turn and being inward of the one arm of the S in the neighboring turn of the winding at the opposite side of the turn and the S-shapes of the turn being so shaped and located as to define the gap between the part of the S-shape connecting the arms of the S.

18. Method for manufacturing a flexible pipe comprising:
helically winding a flexible metal carcass with non-contiguous turns;
providing a gap between turns;
applying a compressible rod into the gap between the turns;
the compressible rod being wound into the gaps of the metal carcass while the latter is under axial tension and the gaps are at their widest;
extruding an internal sheath over the metal carcass;
applying the at least one ply of armour around the internal sheath and at least one external sealing sheath around the ply of armour.

\* \* \* \* \*